(No Model.)

C. T. BARNES.
GRATE AND LINING.

No. 281,658. Patented July 24, 1883.

2 Sheets—Sheet 1.

Witnesses:
H. C. McArthur
Chas. L. Carman

Inventor.
Charles T. Barnes
per J. E. Stevenson,
Attorney.

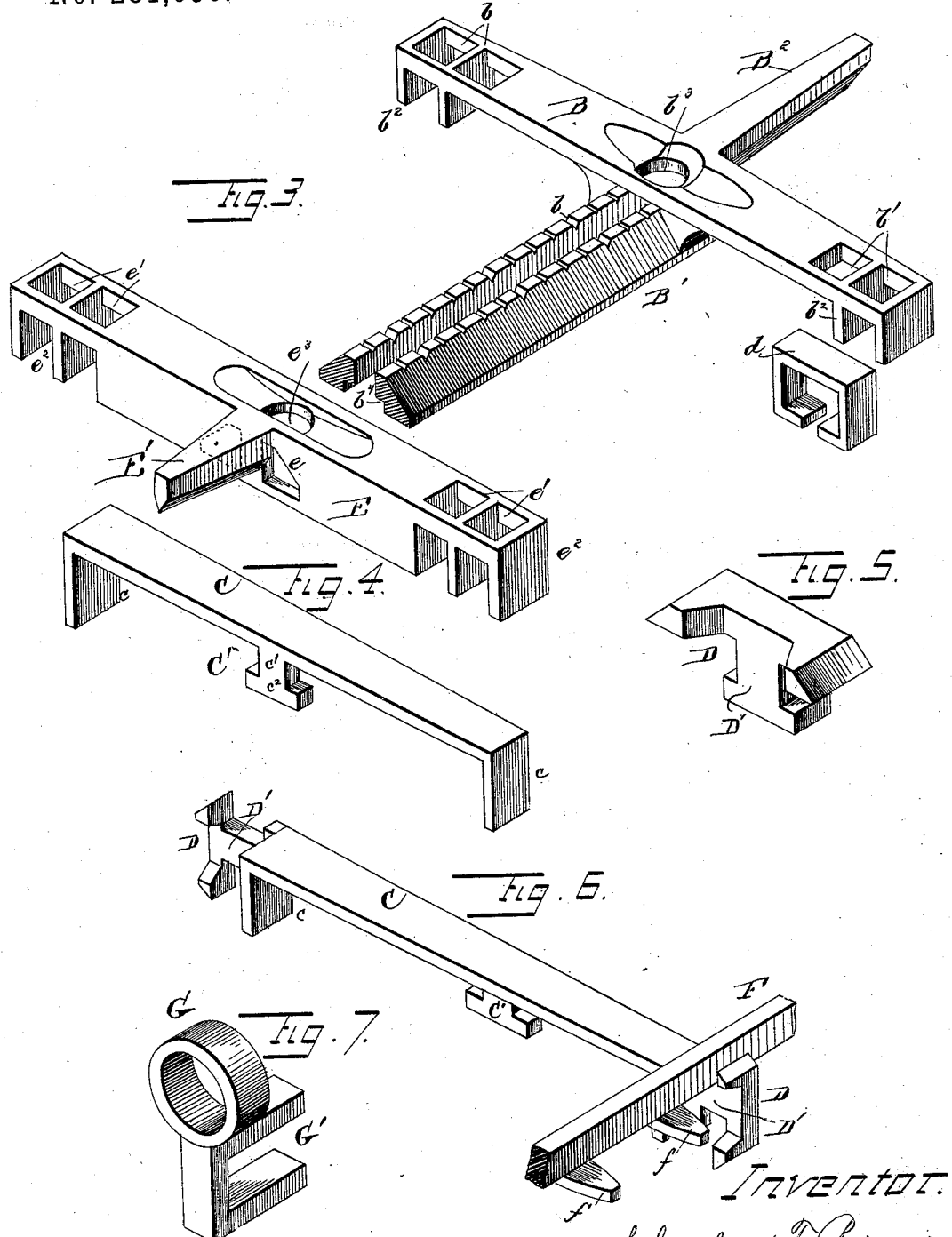

UNITED STATES PATENT OFFICE.

CHARLES T. BARNES, OF CHICAGO, ILLINOIS.

GRATE AND LINING.

SPECIFICATION forming part of Letters Patent No. 281,658, dated July 24, 1883.

Application filed October 28, 1882. (No model.)

*To all whom it may concern:*

Be it known that I, CHARLES T. BARNES, a citizen of the United States of America, residing at Chicago, in the county of Cook and State of Illinois, have invented an Improvement in Grates and Linings, of which the following is a specification, to wit:

My invention relates to combined stove grates and linings; and it consists in a series of bars so formed that they may be combined to form a grate of any required size, the bars of which are separated by small castings; or by omitting the small castings they may be thrown together to form a lining for the backs and ends of stoves and applied either as a grate or lining to any stove, substantially as will be hereinafter more fully set forth.

In order to enable others skilled in the art to which my invention appertains to make and use the same, I will now proceed to describe its construction and operation, referring to the accompanying drawings, in which—

Figure 1:
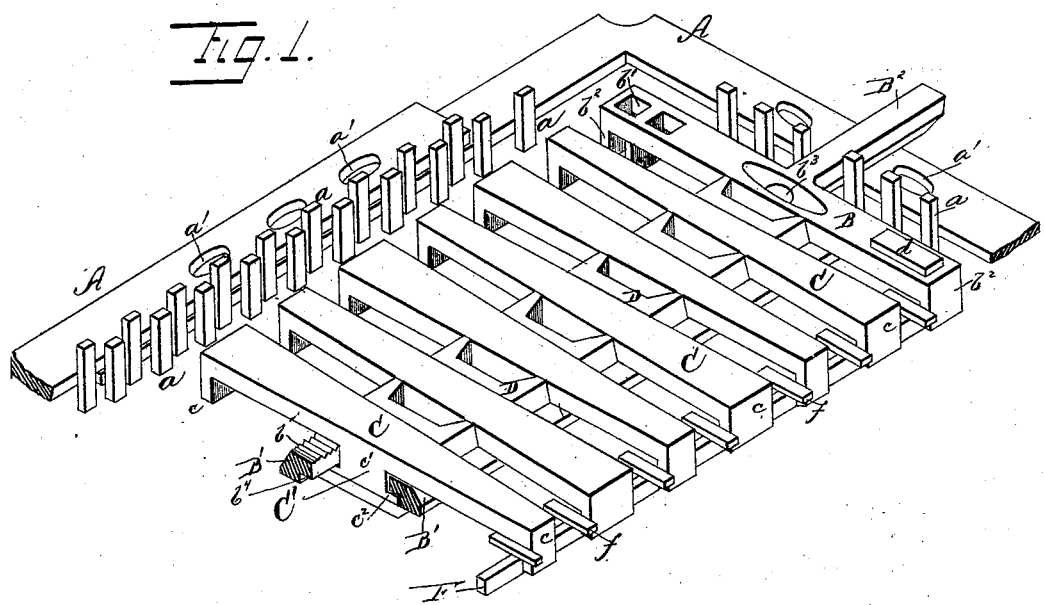
Figure 2:
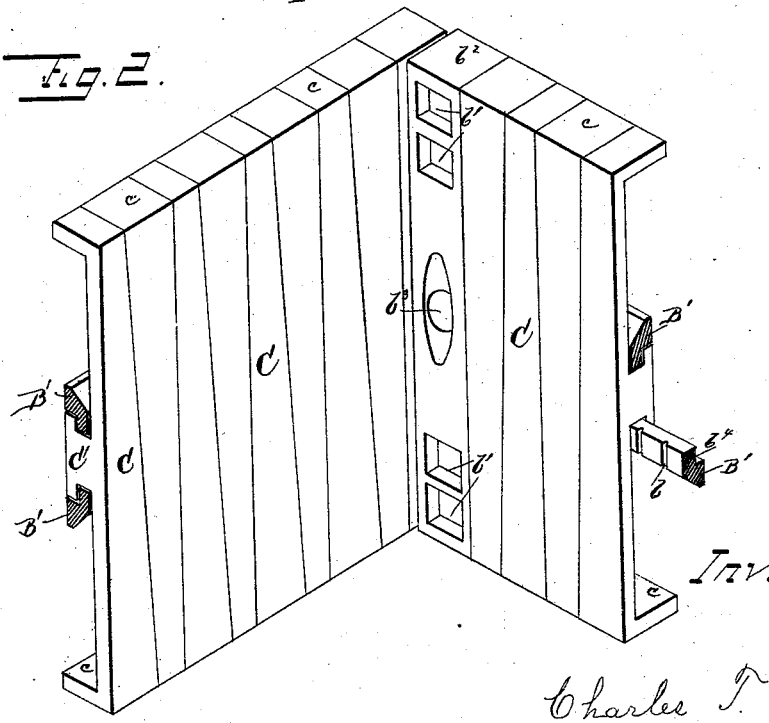

Figure 1 is a perspective view of a part of a grate, such as I describe. Fig. 2 is a similar view of the device arranged for a stove-lining. Fig. 3 is a view of the two end pieces and the central bars upon which the grate-bars are arranged. Fig. 4 is a view of one of the grate-bars. Fig. 5 shows one of the small castings which separate the grate-bars. Fig. 6 is a view of one of the grate-bars having the small castings formed on the ends, and showing the shaking device applied thereto; and Fig. 7 is a view of one of the devices for elevating or lowering the grate.

A represents the grate-frame, which I cast in pieces, each containing one side and one end, having on their inner edges a series of small cross-bars, $a\ a$, projecting above and below the frame, as seen in Fig. 1, and these pieces, when put together, are secured by the interlocking of the small cross-bars $a\ a$ to form a frame, whose length and width may be varied to suit any sized stove. The sides and ends of this frame are also provided with holes $a'$, by which air is allowed to circulate, and may also be used for the passage of bolts.

B designates an end of my grate, cast with the central bars, $B'\ B'$, which are beveled from their upper inner edges downward and outward, as shown, and formed with serrations $b$ across their upper edges, which form passages for allowing the free circulation of air when the grate-bars are laid upon them. Near each end the end piece B is formed with two openings, $b'$, and two downward projections, $b^2$, on its under side, one of which is at the extreme end of the bar, and one depending between the openings $b'$, as seen clearly in Fig. 3. In the center the piece B is provided with a central opening, $b^3$, and from the side opposite the bars $B'$ projects a horn, $B^2$, which forms the pivot upon which the grate turns upon the frame A or in the end of the stove.

C designates a grate-bar, formed with a central projection, $C'$, which is T-shaped on its lower end. The bar C is formed wider at one end than the other, and provided at each end with a lug, $c$, projecting from its lower side, as shown in Figs. 1 and 4. The bars C are slipped on the central bars, $B'$, the shanks $c'$ of their central projection or lug, $C'$, passing between the bars $B'\ B'$ and the T-head $c^2$ resting in longitudinal annular grooves $b^4$ in the lower inner edges of the bars $B'$. The grate-bars C are placed with their wide and narrow ends alternating, as represented in Fig. 1. To keep the grate in proper shape, and to separate them from each other, I place between them, upon the bars $B'$, a small casting, D, having a T-lug, $D'$, on its lower side, corresponding in form and purpose to the similar lug, $C'$, on the grate-bars. When the bars $B'$ are too long for any particular stove to which the grate is to be applied, they are easily broken off, the serrations $b$ serving as breaking-grooves. Having formed the bars C and castings D into a grate of the desired length, the ends of the bars B are inserted in corresponding-shaped openings $e$ in an end piece, E, which is otherwise formed exactly similar to the piece B, with end openings, $e'$, projecting lugs $e^2$, central opening, $e^3$, and a pivotal horn, $E'$.

If it is desired to provide means for shaking the grate, I pass through the openings $b'\ e'$ in the end pieces, B E, a small loop of metal, $d$, open on one side, as shown, for the passage of the lugs $b^2\ e^2$, and in these loops is suspended, as seen in Fig. 1, a bar, F, formed with small cross-bars $f$, which pass between the projecting lugs $c$ on the grate-bars, and when this bar is given a reciprocating motion by means of a common stove-lifter or iron rod the bars $f\ f$ strike the lugs $c$ and cause the grate-bars to oscillate, thereby effectively cleaning them of ashes and cinders.

I find it most convenient to cast the small separating-pieces D on the ends of the grate-bars C, as shown in Fig. 6, and when wanted for use these separating-pieces D may be knocked off the grate-bar. In some cases, however, the grate-bar may be found too short for the size of the stove to which it is desired to fit a grate, and in that case one or both of the small pieces D may be left in position as cast, and form a longer grate-bar. When this is done, it will be found better to lay the shaking-bar F in position upon the pieces D, as seen in Fig. 6, and the bars may then be shaken, as before described. As illustrated in Fig. 2, these grate-bars may be formed into a stove-lining by slipping them on the bars B' B' close together, with the wide and narrow ends alternating, as when forming a grate. Thus the sides and ends of the stove-furnace are formed, and are secured together by passing the horn or arm $B^2$ of one of the end pieces through the central opening, $e^3$, of the other end piece. When it is necessary to form a lining for stoves having a flaring fire-place, the bars C are for a certain distance from each end slipped on the bars B' B', with their large and small ends corresponding with each other, instead of alternating, and thus the lining is formed with beveled ends, which, when placed together, fit the flare of the fire-place in the stove.

Fig. 7 shows a small casting, consisting of a ring, G, provided on one side with a U-shaped clasp, G', which is slipped on the grate-frame to form a bearing for the grate when there is none on the stove, or it may be turned either up or down, to raise or lower a grate to any desired position. The ring G may also be used without the clasp G', to form a washer on one of the horns or pivots of the end pieces of the grate to prevent too much endwise movement.

Such a device as I have described forms an exceedingly cheap and convenient grate which may be packed away into very small compass and put together at any time, and of any size to fit whatever stove is desired, and the same pieces are susceptible of being used to form a stove-lining, which will be found very convenient by dealers in effecting repairs in stoves that have had their grates and linings burned out.

The openings b' e' in the end pieces of the grate are very convenient for securing a leg upon which to rest the grate in stoves intended for burning wood, but which it is desired to convert into coal-burners; and the grates and lining being easily taken apart and put together, it is convenient for repairs when one or two of the bars may be burned out, being easily replaced without the expense of a new grate or lining.

Having thus fully described my invention, what I claim as new, and desire to secure by Letters Patent, is—

1. In a stove-grate the end piece B, provided with the central bars, B', in combination with the end piece E, formed with sockets e, to receive the bars B', substantially as and for the purpose set forth.

2. In a stove-grate, the end piece B, formed with horn $B^2$, bars B', openings b', projections $b^2$, and central openings, $b^3$, in combination with the piece E, cast with sockets e, openings e', projections $e^2$, central opening, $e^3$, and horn E', substantially as shown and described.

3. In a stove-grate, the central bars, B' B', having beveled outer faces, serrations b across their upper face, and the grooves $b^4$ on their inner lower edges, substantially as and for the purpose set forth.

4. In a stove-grate, the bars C, cast with a downward projection, c, at each end, and a central T lug or projection, C', in combination with the central bars, B', substantially as and for the purpose set forth.

5. In a stove grate or lining, the bars C, formed wider at one end than at the other, in combination with the central bars, B', upon which they are removably secured, substantially as and for the purpose set forth.

6. In a stove-grate, independent bars loosely secured to two central bars cast with the end pieces, in combination with the small separating-castings D, provided with a T-shaped lug on their under side, substantially as shown and described.

7. In a grate for stoves, the end pieces, B E, cast with the end openings, b' e', and the central supporting-bars, B', upon which are slipped the independent bars C and separating-pieces D, in combination with the suspending-loops d' and shaking-bar F, formed with cross-lugs f f, substantially as shown and described.

8. In combination with a stove-grate composed of a series of independent bars loosely secured to central supporting-bars, the shaking-bar F, cast with the cross bars or lugs f f, and suspended to the end bars of the grate, whereby a reciprocating motion of the shaking-bar will impart an oscillating movement to the grate-bars to remove ashes and cinders, substantially as shown and described.

9. The combination of the end pieces, B E, and the central supporting-bars, B', with the tapered grate-bars C, cast with a T-shaped lug under their center, whereby they may be formed into either a stove-grate or a stove-lining of varying size and shape, substantially as shown and described.

10. A grate-frame cast in pieces, each containing one side and one end, and provided with locking-lugs along their inner edges, whereby they may be combined to form a frame of any desired length and width, and adapted to be locked together by said lugs, substantially as shown and described.

In testimony whereof I affix my signature in presence of two witnesses.

CHARLES T. BARNES.

Witnesses:
CHAS. KRESSMANN,
FRANK JOHNSON.